(12) United States Patent
Deyaf et al.

(10) Patent No.: US 9,718,395 B1
(45) Date of Patent: Aug. 1, 2017

(54) APPARATUS AND METHOD FOR CONTROLLING A VEHICLE LIGHT WITH ADJUSTABLE LIGHT OUTPUT

(71) Applicant: Feniex Industries, Inc., Austin, TX (US)

(72) Inventors: Hamza Deyaf, Austin, TX (US); Nicholas Mazzanti, Austin, TX (US); Kyle Hale, Austin, TX (US)

(73) Assignee: Feniex Industries, Inc., Austin, TX (US)

( * ) Notice: Subject to any disclaimer, the term of this patent is extended or adjusted under 35 U.S.C. 154(b) by 0 days.

(21) Appl. No.: 15/413,799

(22) Filed: Jan. 24, 2017

Related U.S. Application Data

(63) Continuation-in-part of application No. 15/413,657, filed on Jan. 24, 2017.

(51) Int. Cl.
| | |
|---|---|
| *B60Q 1/14* | (2006.01) |
| *B60Q 1/08* | (2006.01) |
| *F21S 8/10* | (2006.01) |
| *B60Q 1/076* | (2006.01) |
| *B60Q 1/24* | (2006.01) |
| *H05B 33/08* | (2006.01) |

(52) U.S. Cl.
CPC ............. *B60Q 1/08* (2013.01); *B60Q 1/076* (2013.01); *B60Q 1/245* (2013.01); *F21S 48/1329* (2013.01); *F21S 48/1757* (2013.01); *B60Q 2300/114* (2013.01); *B60Q 2300/14* (2013.01); *B60Q 2300/21* (2013.01); *B60Q 2300/312* (2013.01); *B60Q 2900/30* (2013.01); *H05B 33/0854* (2013.01)

(58) Field of Classification Search
CPC ............. H05B 37/0272; H05B 33/0854; B60Q 2900/30
USPC ............. 315/77, 149, 308; 700/83; 307/10.1
See application file for complete search history.

(56) References Cited

U.S. PATENT DOCUMENTS

| | | | |
|---|---|---|---|
| 9,423,090 B1 | 8/2016 | Deyaf | |
| 9,423,092 B1 | 8/2016 | Deyaf | |
| 2016/0023588 A1* | 1/2016 | Peterson | ............ H05B 37/0272 315/77 |
| 2016/0366746 A1* | 12/2016 | van de Ven | ............. F21V 29/74 |

* cited by examiner

*Primary Examiner* — Thuy Vinh Tran

(57) ABSTRACT

An apparatus and method for controlling a vehicle light having an adjustable light output are provided. An apparatus includes a processor configured to receive sensor data from a sensor module having a number of sensors. The processor is further able to determine a light output mode for the vehicle light in accordance with the sensor data. The sensor data indicates a vehicle or environment condition. A method of using an apparatus for controlling a vehicle light with adjustable light output is provided that includes receiving sensor data from one or more sensors in a vehicle, determining a light output mode in accordance with the sensor data, and sending to the vehicle light appropriate commands for adjusting the light output in accordance with the determined light output mode.

28 Claims, 6 Drawing Sheets

APPARATUS AND METHOD FOR CONTROLLING A VEHICLE LIGHT WITH ADJUSTABLE LIGHT OUTPUT

CROSS REFERENCE TO RELATED APPLICATIONS

This application is a continuation in part application of U.S. patent application Ser. No. 15/413,657, filed on Jan. 24, 2017.

FIELD OF THE DISCLOSURE

The illustrative embodiments relate generally to one or more embodiments for a controller system for a vehicle light. Further, the illustrative embodiments relate generally to controlling vehicle lights, whereby the light output emitted from a vehicle light may be adjustable to suit the lighting needs of a driver.

BACKGROUND

Many vehicles, including but not limited to, passenger vehicles, utility vehicles, transportation vehicles, off-road vehicles, emergency vehicles, and other vehicles need vehicle lights to provide illumination. Such illumination is a necessity when vehicles are driven at night. Illumination is also needed in conditions where visibility may be poor, including during inclement weather and/or in locations with limited natural and artificial lighting. Drivers may also choose to supplement their vehicles with auxiliary vehicle lights. The added illumination provided by auxiliary vehicle lights may greatly assist to provide increased visibility of a user's surrounding environment. Further benefit can be achieved by adapting the illumination and light output of vehicle lights and auxiliary vehicle lights to various conditions of vehicle movement and surroundings.

SUMMARY

In one aspect, embodiments disclosed herein relate to an apparatus for controlling a vehicle light having an adjustable light output. In one or more embodiments, the apparatus includes a processor configured to receive sensor data and to determine a light output mode for the vehicle light in accordance with the sensor data. The sensor data may indicate a vehicle or environment condition. Further, the apparatus may include a transceiver coupled to the processor and configured to signal the light output mode to the vehicle light.

In another aspect, embodiments disclosed herein relate to a method of controlling a vehicle light with an adjustable light mode. A method may include, according to embodiments in the present description, receiving sensor data from one or more sensors in a vehicle, whereby the sensor data may determine a vehicle or environment condition. Further, the method may include determining, using a processor, a light output mode in accordance with the sensor data, and sending to the vehicle light appropriate commands for adjusting the light output in accordance with the determined light output mode.

In yet another aspect, embodiments disclosed herein relate to an apparatus for controlling a vehicle light with adjustable light output. In one or more embodiments, the apparatus may include a processor configured to receive user input and determine an angle of spread of light for the vehicle light in accordance with the user input. The apparatus may further include a transceiver coupled to the processor and configured to signal the determined angle of spread of light to the vehicle light.

In yet another aspect, embodiments disclosed herein may relate to a method of controlling a vehicle light with adjustable light mode. In one or more embodiments, the method may include receiving user input from a user input interface in a vehicle. Using a processor, the method may include determining an angle of spread of light for the vehicle light in accordance with the user input. In addition, the method may include signaling the determined angle of spread of light to the vehicle light.

Other aspects and advantages of the invention will be apparent from the following description and the appended claims.

DETAILED DESCRIPTION

Figure 1:
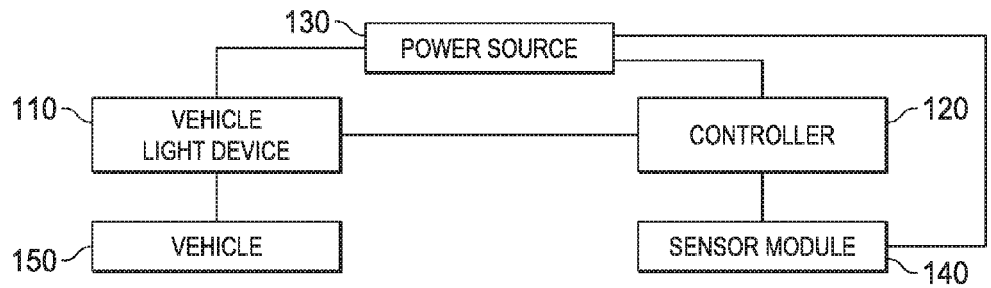
FIG. 1 is a block diagram of components including a vehicle light with a corresponding controller in accordance with an illustrative embodiment.

In the following detailed description, numerous specific details are set forth in order to provide a more thorough understanding of the one or more embodiments described herein. However, it will be apparent to one of ordinary skill in the art that the invention may be practiced without these specific details. In other instances, well-known features have not been described in detail to avoid unnecessarily complicating the description.

Throughout the drawings, like reference characters are used to designate like elements. As used herein, the term "coupled" or "coupling" may indicate a connection. The connection may be a direct or an indirection connection between one or more items. Further, the term "set" as used herein may denote one or more of any item.

In the following discussion and in the claims, the terms "including" and "comprising" are used in an open-ended fashion, and thus should be interpreted to mean "including, but not limited to . . . ."

As a preface to the detailed description, it should be noted that, as used in this specification, the singular forms "a", "an", and "the" included plural referents, unless the context clearly dictates otherwise.

The term vehicle is used herein to indicate any transportation vehicles including road vehicles, off-road vehicles, wheel-based vehicles, special track vehicles, water vehicles, snow vehicles, or other driven vehicles. Drivers of such vehicles use vehicle lights for illuminating surrounding environment. Further, drivers may choose to supplement their vehicles with auxiliary vehicle lights that are attached to one or more surfaces of a vehicle in order to provide additional or enhanced light and illumination for a vehicle. For example, drivers of emergency vehicles, such as police, fire, and emergency medical service (EMS) vehicles, or drivers of off-road vehicles, such as for recreational use or outdoor activities, may supplement their vehicle lights with auxiliary vehicle lights. Enhanced illumination can also become a necessity for many vehicles when driven or operated either at nighttime and/or in conditions with poor visibility, such as during rainstorms, fog, or icy weather.

In general, the term "vehicle light" used herein can be any suitable light fixture comprising a light source and used in a vehicle. The vehicle light can be an integrated part of a vehicle or can be any type of auxiliary vehicle light attached to or mounted on a vehicle. Examples of vehicle lights include light heads, light bars, dash lights, or any type of mounted lights. The different illustrative embodiments of the present disclosure provide for a controller system for adjusting the light output of vehicle lights, such as the angle of light spread, which could benefit drivers of various vehicles. The controllers are used to adapt one or more vehicle lights to the environment or driving condition of a vehicle. The light output from a vehicle light may be controlled to achieve a particular light output, such as a particular angle of light spread.

It is noted that U.S. Pat. Nos. 9,423,090 and 9,423,092, which are assigned to the present assignee, describe one or more embodiments for a vehicle light whereby the light produced from the light source within the vehicle light may be adjustable over a range of angles so as to have an adjustable spread of light output. U.S. Pat. Nos. 9,423,090 and 9,423,092 are incorporated herein in their entirety.

The one or more embodiments described herein may provide for a vehicle light whose angle of light spread, for example, may be adjusted to produce various sized floodlights or spotlights to suit the preferences or driving needs of a driver. Beneficially, drivers may welcome a vehicle light that provides more than a single type of light output mode, because such a vehicle light may effectively replace multiple vehicle lights that are conventionally used to provide either solely a spotlight or floodlight, but not both. Further, drivers may welcome a vehicle light that may be controlled either manually via user input selection or autonomously as further discussed in the present disclosure. Other properties of light output may also be adjustable using the vehicle light controller disclosed herein. For instance, controlling the light output can include adjusting a particular shape of light beam to produce a desired shape, such as, for example purposes only, a circular or elliptical light beam. An elliptical light beam, for example, may be advantageous to cover a wider area. In one or more embodiments, adjusting the light output can also include increasing/decreasing the intensity alight output such as for different visibility conditions.

FIG. 1 shows a block diagram of components including a vehicle light 110 with a corresponding controller 120 in accordance with an illustrative embodiment. Vehicle light 110 may be coupled to any surface of a vehicle, such as vehicle 150. Vehicle 150 may be any type of automobile, including, without limitation, an emergency vehicle or an off-road vehicle. Vehicle 150 may be a road driven vehicle or a wheel based vehicle. Other vehicle types can also use this system for controlling the light output, such as, without limitation, water or marine based vehicles, snow gliding vehicles, military vehicles, or industrial vehicles. When vehicle 150 is an off-road vehicle, vehicle 150 may be driven over uneven, unpaved terrain of every kind and in environments with little to no artificial lighting.

Vehicle light 110 can be a light fixture attached to vehicle 150, and may include at least one light source such as a light bulb or a light emitting diode (LED). The auxiliary light fixture may be attached on any suitable area on the surface of the vehicle. For example, the vehicle light 110 can be placed on the top surface of the vehicle or on the front hood. In another embodiment, the vehicle light 110 is an integrated light fixture of the vehicle, such as a headlight or backlight of the vehicle.

The controller 120 for the light source 110 can be located in the vehicle. The controller 120 includes electric or electronic components for controlling and adapting the vehicle light 110 to change the behavior of the light output from the vehicle light 110. For example, changing the behavior of the light output includes changing the angle of light spread of the light beam as projected from the vehicle light 110 outside the vehicle. The controller 120 communicates with the vehicle light 110 via a wired connection (e.g., a cable or wire) or a wireless connection (e.g., through some form of wireless signals with suitable range). Although one light device 110 is shown in FIG. 1, in some embodiments, controller 120 may be coupled to multiple light devices 110. In such embodiments, the multiple light devices 110 can be controlled jointly or independently by controller 120. For instance, controller 120 similarly and jointly may be configured to increase or decrease the light spread of two front headlights on both sides of the vehicle.

A power source 130, such as a vehicle battery, supplies the vehicle light 110 and the controller 120 with power. Examples of vehicle batteries that may serve as a power source, such as power source 130 may include, but are not limited to, lead-acid batteries used in fuel vehicles, or lithium-ion batteries used in electric or hybrid vehicles. The vehicle light 110 and the controller 120 can be connected to the power source 130 via wires or electric cables in any suitable arrangement. For example, vehicle light 110 and controller 120 may be supplied power from the power source 130 directly or through other components. In one implementation, either one of the two components (i.e. vehicle light 110 and controller 120) can be connected to the power source 130 and, in turn, supply some of the power to the other component via a cable.

In an embodiment, the system may also include a sensor module 140, which consists of one or more sensors. The sensor module 140 may be used to provide autonomous control for the vehicle light 110, as described further below. The sensor module 140 is connected to the controller 120 and provides the controller 120 with data, which can be analyzed by the controller 120 to determine a proper adjustment of the light output for the vehicle light 110. The connection between the sensor module 140 and the controller 120 can be a wired connection (e.g., an electric cable or wire) or a wireless connection through some form of wireless signaling). For example, the sensor module 140 can send data to the controller 120 via radio signals. In one embodiment, the sensor module 140 is also connected to the power source 130 via wire or electric cable in any suitable arrangement. For example, the sensor module 140 may receive supplied power from the power source 130 directly or through other components. In one implementation, either one of the sensor module 140 and the controller 120 can be connected to the power source 130 and in turn supply some of the power to the other component via a cable.

Figure 2:
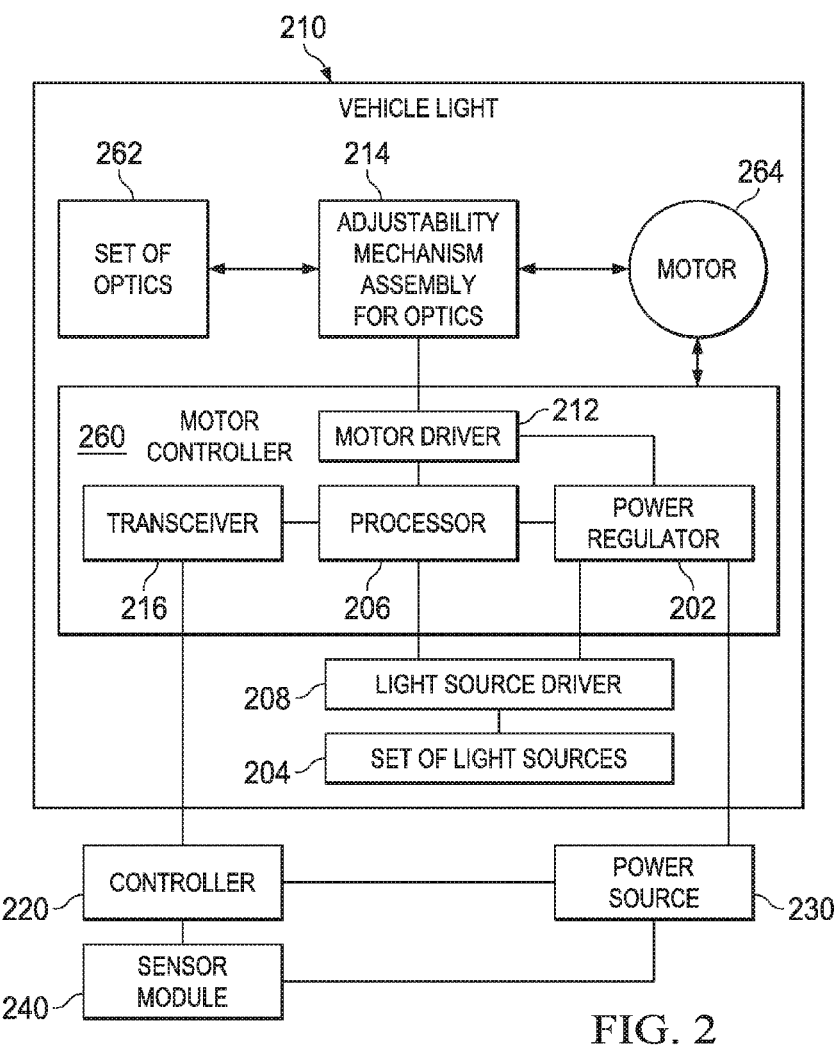
FIG. 2 is a block diagram of components of a vehicle light adjustable by a controller in accordance with an illustrative embodiment.

FIG. 2 shows a block diagram of components of a vehicle light 210 adjustable by a controller 220 in accordance with an illustrative embodiment. Vehicle light 210 and controller 220 may be a vehicle light and a controller in accordance with vehicle light 110 and controller 120 in FIG. 1. Although one vehicle light 210 is shown in FIG. 2, the system can include any number of vehicle lights 210 with similar components. The connection between each vehicle light 210 and the controller 220 can be a wired or a wireless connection. The function of the controller 220 is to adjust the light output behavior, for instance, the angle of light spread, of each connected vehicle light 210. The controller 220 may also be connected to a sensor module 240. A power source 230 supplies power to the vehicle light 210, the controller 220, and the sensor module 240 via suitable wiring. In another embodiment, the controller 220 is connected to a set of one or more sensors that may not be collocated in a single sensor module but in various locations in the vehicle.

The vehicle light 210 is a fixture or an enclosed apparatus containing one or more light sources, such as, the set of light sources 204. In an embodiment, a set of one or more LEDs (light emitting diodes) is used as set of the light sources 204. Alternatively, any other suitable light source known in the art may be used.

The set of light sources 204 emits a light output in the form of a projected beam of light. The light beam is projected through a set of one or more optics, such as set of optics 262, in the vehicle light 210. As used herein, set of optics 262 may include, without limitation, lenses, reflectors, and total internal reflecting (TIR) optics having embedded lenses. As used herein, the term "optics" may refer to any component used to direct or manipulate a light beam along a light trajectory from the set of light sources 204. For instance, the set of optics, as used herein, may refer to the assembly of lenses, reflectors such as mirrors with any shaped surface, TIR components, optic light filters such as thin films, or any combination thereof.

One or more properties of the light output may be variable depending on a position of the set of optics, such as set of optics 262 contained within vehicle light 210 with respect to set of light sources 204. In one or more embodiments, an angle of light spread may be varied. Further, the angle of light spread of the set of light sources 204 may be the result of the projection of the light beams from the light sources 204 through the optics. Thus, controlling the positioning of and the spacing between the optics in the set of optics 262 and the set of light sources 204 affects the shape of the light output, such as the angle of light spread projected from the vehicle light 210. The angle of light spread is usually measured in degrees. The light spread can range from a relatively narrow spotlight to a floodlight with a wider angle of spread. Spotlights are suitable to highlight a narrow area in front of a light source. Typically, spotlights are also used for highlighting areas at further distances or in lower visibility conditions. Floodlights provide a wider view and are suitable to include areas further to the side.

In another implementation, another example of changing the light output shape is switching the spot of light projection between a circular and elliptical shape. This can be achieved by controlling the positioning of the optics in the vehicle light 210. Other light output behavior can also be adjusted through any suitable design of the vehicle light components. For example, the vehicle light 210 can include different sets of LEDs that can be turned on to determine different shapes of light projection.

The positioning and spacing between the set of optics 262 and the light sources 204 can be adjusted with an adjustability mechanism assembly 214, which may be coupled to the set of optics 262 and allows for movement of the set of optics 262 with respect to the set of light sources 204, and thus modifying the shape of the light output. For example, when an optic (e.g. optic 401 in FIG. 4) is moved in a linear direction towards or away from the set of light sources 204, the angle of light spread is modified. The adjustability mechanism assembly 214 may comprise any suitable electromechanical components known to one of ordinary skill in the art for moving the optics and hence varying the spacing between the optics and the light source 204. In one or more embodiments, adjustability mechanism 214 may include, without limitation, a yoke (not shown) having a set of yoke lobes, a shaft, and a set of cams integrated with or attached to the shaft. Further, the shaft of adjustability mechanism may be rotatably coupled to a motor (e.g. motor 264) either coupled to or located within a housing of vehicle light 210. Further, the adjustability mechanism 214 may be coupled to the set of optics 262 disposed within vehicle light 210. In one or more embodiments, whereby the adjustability mechanism 214 includes a shaft as discussed above, as the shaft rotates, thereby causing the cams to rotate within an inner perimeter of the set of yoke lobes disposed on the yoke, the yoke may be caused to move linearly forwards and backwards.

The yoke may be coupled to the set of optics 262 using one or more coupling members (e.g. slide rails or any other fasteners known in the art). The linear movement forwards and backwards of the set of optics towards a set of light sources, such as set of light sources 204 also contained within the vehicle light 210 may result in either a spotlight or a floodlight. Thus, adjustability mechanism 214 may be configured to manipulate the positioning and spacing of the optics 262 with respect to set of light sources 204 and accordingly to determine the angle of light spread and achieve either a floodlight or a narrow spotlight.

To manipulate a position of the shaft (not shown) in adjustability mechanism assembly 214, one or more motors, such as motor 264, may be included with vehicle light 210. Any suitable motor as known the art may be used for motor 264. In one implementation, motor 264 may be coupled to a housing of vehicle light 210. Alternatively, motor 264 may be integrated within a body of vehicle light 210.

In one implementation, a motor 264 in vehicle light 210 may be rotatably coupled to a shaft disposed within adjustability mechanism 214. A gear train mechanism having one or more gears may be rotatably coupled to motor 264, and a shaft of adjustability mechanism 214 may be rotatably coupled to motor 264. Thus, any rotational movement provided by motor 264 may be transmitted to a shaft in adjustability mechanism 214, which in turn, affects a position of a set of optics 262 that may be coupled to adjustability mechanism 214.

To control motor 264, a motor controller, such as motor controller 260 may be located within vehicle light 210. Motor controller 260 may be a controller used to control motor 260 and one or more functions of vehicle light 210. Motor controller 260 may include, without limitation, motor driver 212, transceiver 216, processor 206, and power regulator 202. Alternatively, any of these components may be separately located from motor controller 260 and used as needed.

Controller 220 may, in one or more embodiments, be a device separate from light device 210. Controller 220 may provide the mechanism for sending an input or signal to vehicle light 210 in order to produce either a floodlight or a spotlight. In one embodiment, controller 220 may transmit the data signals to motor controller 260. For instance, using data from the sensor module 240, the controller 220 may transmit commands to motor controller 260 to determine the movement needed for motor 264 and the adjustability mechanism assembly 214 for proper light spread adjustment.

The controller 220 may communicate with a transmitter/receiver module (transceiver) 216 in motor controller 260 to send/receive the control data. The transceiver 216 may be a wireless transceiver that communicates via wireless signaling with the controller 220, or may be connected via a data cable to the controller 220. In an embodiment, the transceiver may support both wired and wireless connectivity with the controller 220.

As previously discussed, motor controller 260 within vehicle light 210 may include processor 206. Processor 206 handles the control data from the transceiver 216 and forwards appropriate corresponding commands to motor 264. The processor 206 can be any chip or electronic board suitable for processing such data, e.g., in digital data. For example, the controller 220 may decrease the angle of light spread to achieve a spotlight during vehicle acceleration, or may increase angle of light spread during vehicle turns. The processor 206 receives from the controller 220 the control data to increase or decrease the light spread and sends appropriate commands to motor 264. A motor driver 212 may be included in vehicle light 210 to convert the commands into suitable input parameters for the motor 264, as known to one of ordinary skill in the art.

The control data from the controller 220 may also determine the lighting level or mode of the set of light sources 204. For example, the controller 220 may be configured to increase light intensity or turn on more LEDs in a light bar in case of low visibility condition or during a vehicle turn. In this case, processor 206 may forward appropriate corresponding commands to the set of light sources 204. A light source driver 208 may be used to convert such commands into suitable input parameters for the light source 204.

Motor controller 260 may also include a power regulator 202 connected to the power source 230. The function of the power regulator 202 is to control the power distribution path to components of the vehicle light 210, such as the processor 206, the motor driver 212, the light source driver 208, the adjustability mechanism assembly 214 and the light sources 204. In addition, the power regulator 202 may provide additional functions such as filtering power noise from the power source 230, providing safety measures against installation mistakes, regulating voltage levels for devices requiring different operating voltages, and limiting the current draw.

Figure 3:
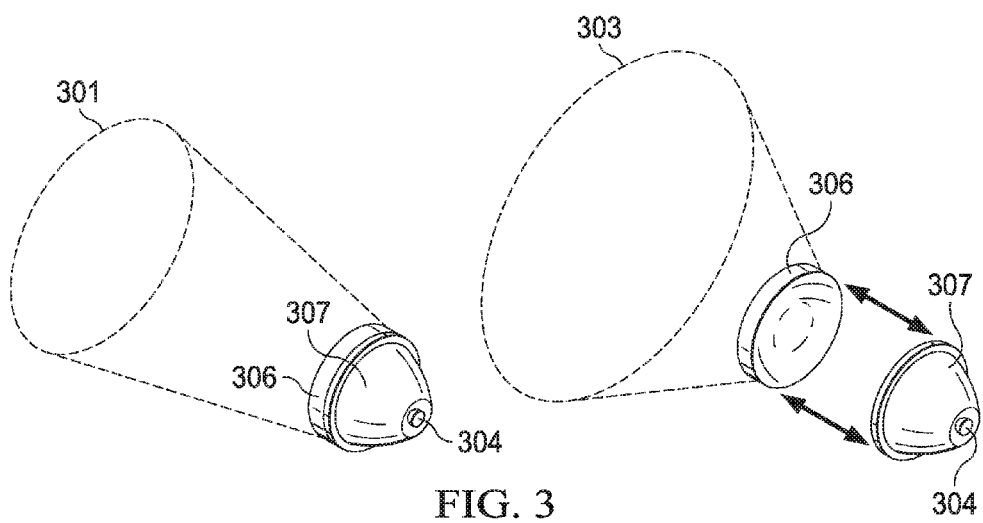
FIG. 3 is an illustration of adjustable light output or light spread of a vehicle light in accordance with an illustrative embodiment.

FIG. 3 shows a pictorial view of an adjustable light output or light spread for a vehicle light in accordance with an illustrative embodiment. Two possible light outputs 301 and 303 are shown for two configurations of a vehicle light. The vehicle light comprises a light source 304, a first optic component 306 positioned in front of the light source 304, and a second optic component 307 surrounding the light source 304 and positioned between the light source 304 and the first optic component 306. The first optic component 306 is a lens that spreads out the incoming light beam emitted from the light source 304. The second optic component 307 is another optical component capable of reflecting and directing light emitted from the light source 304 towards the first optic component 306. In this embodiment, the first optic 306 is moveable, via some suitable adjustability mechanism assembly, while the second optic 307 is stationary with the light source 304.

The first light output 301, which corresponds to a spotlight with a narrow light spread, can be achieved by positioning the first optic 306 in proximity or adjacent to the second optic 307. When the first optic 306 is moved further away from the second optic 307, a second light output 303 which corresponds to a floodlight with a broad light spread is achieved. In one implementation, adjustability mechanism 214 as discussed with respect to FIG. 2 may be used to position first optic 306 with respect to second optic 307.

Figure 4:
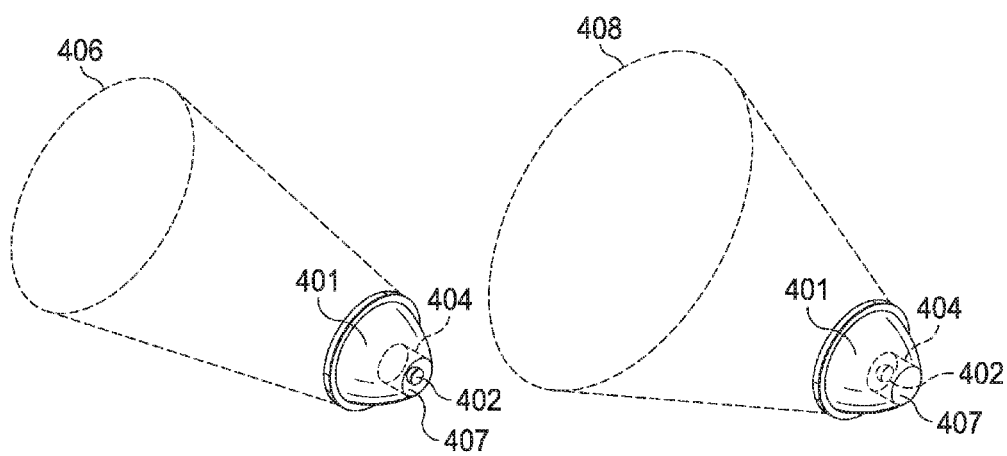
FIG. 4 is an illustration of adjustable light output or light spread of a vehicle light in accordance with an illustrative embodiment.

FIG. 4 shows a pictorial view of an adjustable spread light output or angle of light spread in accordance with an illustrative embodiment. FIG. 4 shows spotlight 406 and floodlight 408, which may be produced when an optic, such as optic 401 is extended away from or retracted towards a light source, such as LED 402. In one or more embodiment, optic 401 may be a total internal reflection (TIR) optic having an embedded plano-convex lens. In one implementation, the optic may have a generally parabolic shape. The embedded plano-convex lens may be embedded within the generally parabolic shape, such that the front surface of the TIR optic tapers inwardly toward the embedded plano-convex lens. In addition, optic 401 may include a hollow channel 404 formed in a rear surface 407 of optic 401, whereby, in one instance, the hollow channel extends only partially through a thickness of optic 401.

In one or more embodiments, to produce a spotlight, such as spotlight 406, optic 401 may be extended away, i.e. moved away from LED 402. To produce a floodlight, such as floodlight 408, optic 401 may be retracted towards, i.e. moved proximate to LED 402.

An adjustability mechanism located in a vehicle light, such as adjustability mechanism 214 in vehicle light 210 discussed above with respect to FIG. 2, may be used to adjust a position of optic 401 with respect to LED 402. Accordingly, LED 402 and optic 401 may be contained within a vehicle light, such as vehicle light 210. By changing a position of optic 401 with respect to LED 402, an angle of light spread produced by LED 402 may be varied and adjusted to best suit the lighting needs of a user and/or driver of a vehicle, such as vehicle 150

Figure 5:
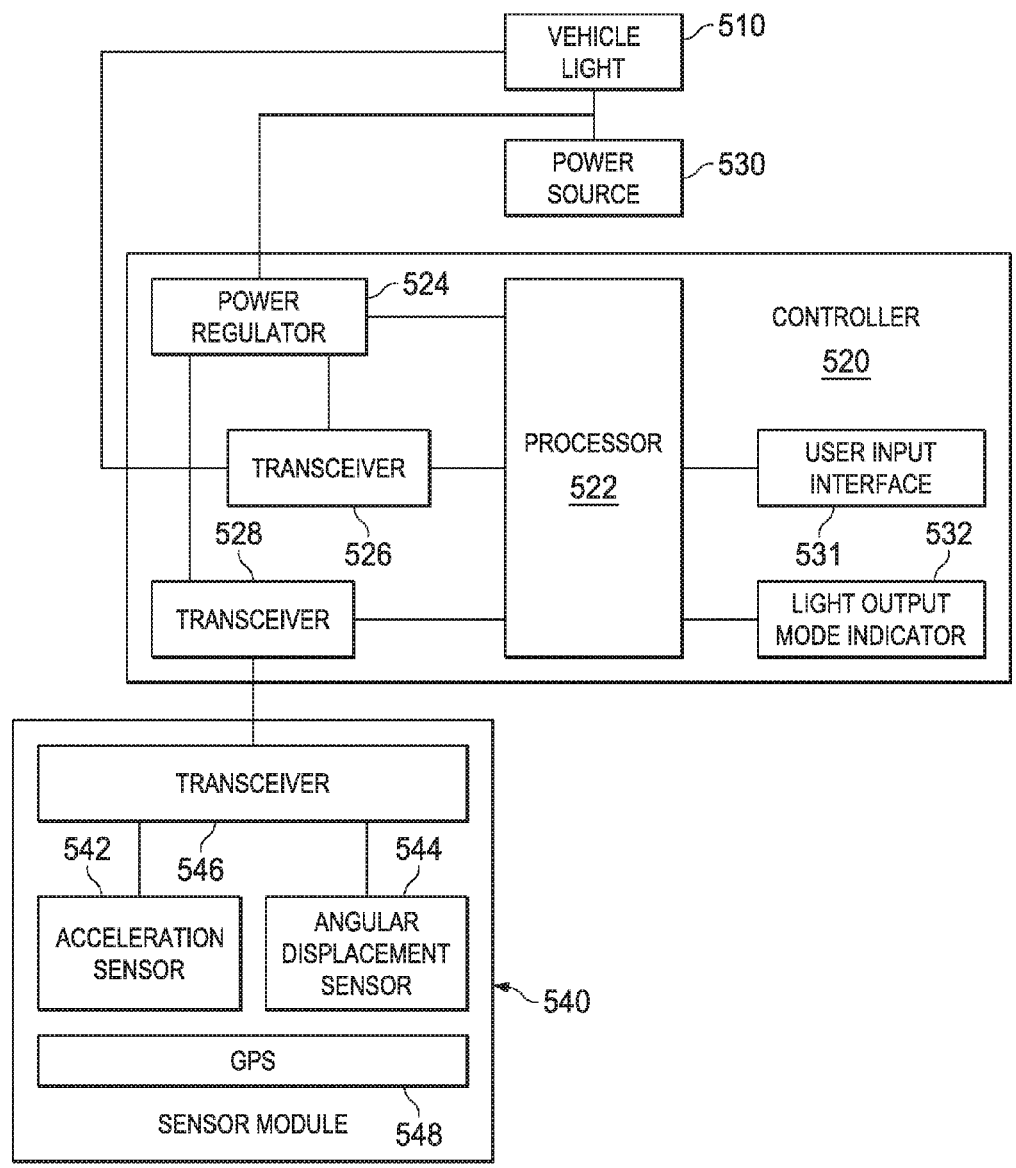
FIG. 5 is a block diagram of components of a controller for adjusting a vehicle light in accordance with an illustrative embodiment.

FIG. 5 shows a block diagram of components of a controller 520 for adjusting a vehicle light 510 in accordance with an illustrative embodiment. Controller 520 may be a controller in accordance with controller 120 in FIG. 1 and controller 220 in FIG. 2. Further vehicle light 510 may be a vehicle light in accordance with vehicle light 110 in FIG. 1 and vehicle light 210 in FIG. 2.

As described above, the connection between the controller 520 and the vehicle light 510 can be a wired or a wireless connection. The controller 520 is also connected to a sensor module 540. The sensor module 540 may be a separate component connected to the controller 520. Alternatively, the sensor module 540 may be an integrated part of the controller 520. Sensor module 540 may be a sensor module in accordance with sensor module 140 in FIG. 1 and sensor module 240 in FIG. 2.

A power source 530 supplies power to the vehicle light 510, the controller 520, and the sensor module 540 via suitable wiring. Power source 530 may be a power source in accordance with power source 130 in FIG. 1 and power source 230 in FIG. 2.

The sensor module 540 includes one or more sensors for measuring or collecting data related to vehicle movement or any data that can be used to determine a suitable light output mode for the vehicle light 510. The sensor module 540 can include an accelerometer (e.g. acceleration sensor 542) that measures the acceleration of the vehicle. Further, sensor module 540 may include an angular displacement sensor 544 that reflects the angular displacement of the vehicle. For instance, the sensor module 540 can include a gyroscope (also referred to as a gyrometer or gyro) that measures the angular velocity of a moving vehicle.

In an embodiment, the sensor module 540 can include a global positioning system (GPS), such as GPS 548 as shown in FIG. 5, for sensing the location of the vehicle. Other sensors can also be used in the sensor module 540, such as a photodetector for determining the visibility outside the vehicle. A time clock can also be part of or coupled to the sensor module 540 to determine the time of day. The sensors may be collocated in a single module or box in the vehicle or may be dispersed at different suitable areas of the vehicle. The sensor module 540 may also be connected to vehicle built-in sensors, for instance, via an on-board diagnostic II port connection.

The collected sensor data from the sensor module 540 may be sent using a transceiver 546 in the sensor module 540 to a corresponding transceiver 528 in the controller 520 using a wireless or wired connection. For example, the sensor module 540 can communicate with the controller 520 using a radio wave frequency connection, a Universal Serial Bus (USB) connection, or a fixed wiring between the two components. In another embodiment, the sensors may be integrated parts of the controller 520 and thus the sensor data is obtained directly without a transceiver.

The controller 520 includes a processor 522 that receives the sensor data from the transceiver 528. The processor 522 processes the sensor data to determine a suitable light output mode or output such as the light spread of the vehicle light 510 and forwards to the vehicle light 510 the appropriate commands to implement the light output mode. The light output mode data is sent through a transceiver 526 to the vehicle light 510. The processor 522 can be any type of a processor suitable for processing such data, e.g., digital data. For example, the processor 522 can be a chip, a central processing unit (CPU), a computer board, or an electronic card.

The controller 520 may also include or be connected to a user input interface 531 that can be used by a driver or a user to select a light output mode for the vehicle light 510. The user input interface 531 is connected to the processor 522 which converts the user input selection into suitable commands for the vehicle light 510. As shown in FIG. 5, user input interface 531 is part of controller 522. Alternatively, user input interface 531 may be separate from controller 522, in which case user input interface 531 may be positioned anywhere accessible to the driver or user and connected to the controller 520. For example, the user input interface 531 can be placed on the steering wheel, on the side console, or anywhere near the driver.

The user input interface 531 can include any number of knobs or press buttons (e.g. press buttons 602, 604, 606 and knob 608 shown in FIG. 6A) to select from multiple light output modes, such as a spotlight or floodlight mode, or to decrease and increase the angle of light spread. For example, the user can press one of two buttons to select a spotlight or floodlight mode, or can turn a knob to decrease or increase the light spread angle. In another embodiment, the user input interface 531 corresponds to a touch screen for selecting the light output mode. In an embodiment, the user input interface 531 can be used to preset or adjust the settings of a light output mode. For instance, the user can determine the angle of spread in degrees for the spotlight or floodlight mode. The user may also set the conditions for selecting a certain light output mode. For example, the user can set the speed at which the light output mode can switch from floodlight to spotlight, or can select which light output mode to switch to during a vehicle turn.

The user input interface 531 may also allow the user to switch between a manual operation and autonomous operation to select the light output mode. Manual operation allows the user to select the light output mode using the knobs, press buttons, or touch screen. In autonomous operation, in one or more embodiments, the processor 522 in controller 520 may select the light output mode based on sensor data, as described above, whereby upon detecting particular sensor data, the processor 522 communicates with vehicle light 510 to produce a predetermined light output and desired angle of light spread.

In FIG. 5, including both the sensor module 540 and the user input interface 531 in the controller system allows for both manual operation (by user input) and autonomous operation (using sensor data) in adjusting the light output of the vehicle light 510. In another embodiment, the controller system includes the user input interface 531 without the sensor module 540 and supports the user manual operation mode without autonomous operation. In yet another embodiment, the controller system provides autonomous operation mode without user manual operation. In this case, a sensor module 540 may not be needed.

The controller 520 may also include or be connected to a light output mode indicator 532 that indicates in some manner the current light output mode of the vehicle light 510. The light output mode indicator 532 can be part of the controller 520, or can be positioned anywhere accessible to the driver or user and connected to the controller 520. For example, the light output mode indicator 532 can be part of the vehicle dashboard or front panel. The light output mode indicator 532 can display the angle of light spread, e.g., in degrees, in the form of numbers, a gauge, a LED screen, or other display. In an embodiment, the light output mode indicator 532 and the user input interface 531 are combined into a device possibly comprising a touch screen. In such an embodiment, the user or driver made aware of the current light output mode can then decide whether to keep such mode or manually adjust the light spread.

The controller 520 also includes a power regulator 524 connected to the power source 530. The power regulator 524 regulates and controls the power distribution path to components of the controller 520, such as the processor 522, the transceivers 526 and 528, the user input interface 531, and the light output mode indicator 532.

At least some of the components of the controller 520 may be combined in a single box. The controller box may be located or placed in any suitable location in the vehicle. In an embodiment, at least some of the components of the controller 520, such the user input interface 531 or the light output mode indicator 532 may be implemented on a smart communications device, such as a smartphone or a computer tablet. The sensor module 540 may also be implemented by a smart communications device, for example a smartphone including an accelerometer, a GPS and/or a gyroscope. The controller box may also correspond to a smart communications device.

Figure 6A:
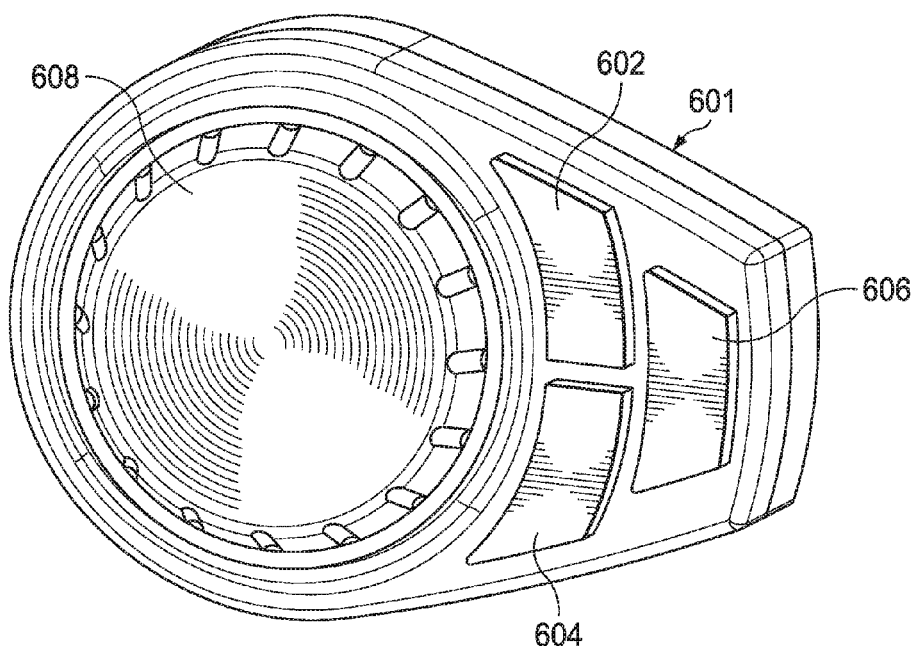
FIG. 6A is an illustration of a front perspective view of a controller device adapted to be mounted on, handheld, or placed anywhere in a vehicle in accordance with an illustrative embodiment.
Figure 6B:
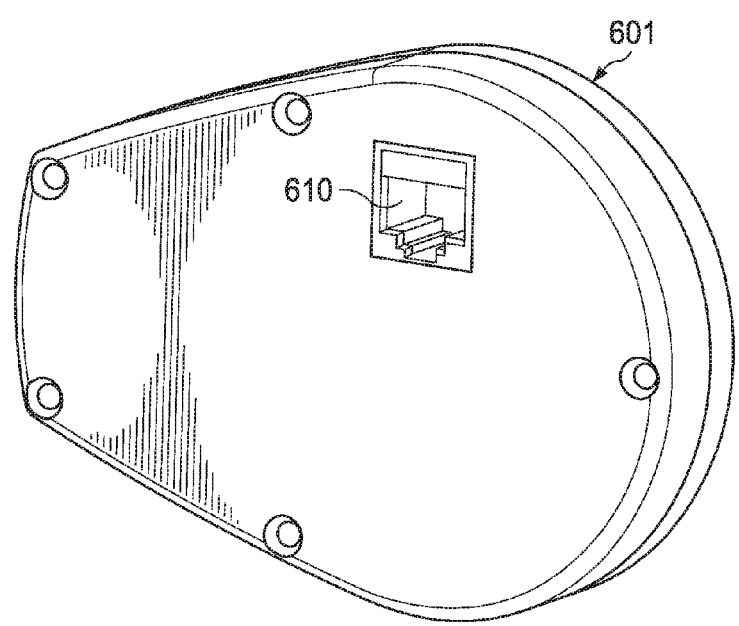
FIG. 6B is an illustration of a rear perspective view of the controller device of FIG. 6A in accordance with an illustrative embodiment.

FIGS. 6A and 6B illustrate front and perspective views, respectively, of a controller device (e.g. controller 601) adapted to be mounted on, handheld, or placed anywhere in a vehicle in accordance with an illustrative embodiment. Controller 601 may be a controller configured to operate and include components described in the present description for controller 120 in FIG. 1, controller 220 in FIG. 2, and controller 520 in FIG. 5.

In one or more embodiments, controller 601 can be mounted using a mount, a holder, adhesives, taping, or any other suitable means of removeably or permanently connecting or attaching controller 601 to a surface of a vehicle as known in the art. In one exemplary embodiment, controller 601 may be attached to the vehicle dashboard or console. Alternatively, the controller device 601 can be operated as a portable remote control device that is not specifically attached or mounted to a surface of a vehicle.

In a non-limiting, exemplary embodiment of a controller, the external components on controller device 601 (as shown in FIG. 6A) include three press buttons 602, 604 and 606 and a knob 608, which serve as the user input interface (e.g. user input interface 531).

In one or more embodiments, the press buttons 602 and 604 can be used to select a spotlight or floodlight mode, Additionally, or alternatively, the knob 608 can be turned to manually increase or decrease the angle of light spread by the user. In addition, in one or more exemplary embodiments, the button 606 can be pressed to select a manual or autonomous operation mode (as discussed above) or to switch the light device on or off. In an embodiment, controller 601 may also include a LED (not shown) that serves as light output mode indicator, for example, around or on the knob 608. In other embodiment, fewer or more buttons may be included to serve various suitable functions of the controller.

Controller 601 can communicate remotely, via a wireless transceiver, with controller components, such as a processor, located in the vehicle. Additionally, or alternatively, the rear of controller 601 can include a port 610 for a data cable connection, as shown in FIG. 6B. The connection can be used to connect controller 601 to other controller system components in the vehicle, including to a sensor module, such as sensor module 540 in FIG. 5.

Figure 7:
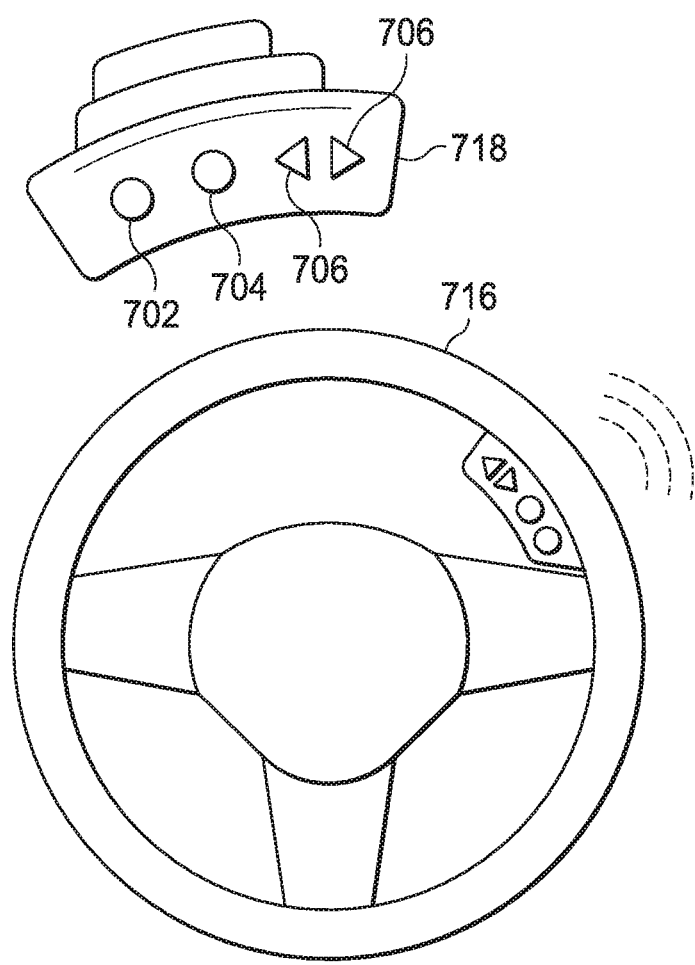
FIG. 7 is an illustration of a controller device mounted on a steering wheel in a vehicle in accordance with an illustrative embodiment.

FIG. 7 shows another illustrative embodiment for a controller device 718 mounted on or attached to a steering wheel 716 in a vehicle. The controller device 718 is a user input interface connected, wirelessly or through wiring, to other controller system components in the vehicle. For instance, controller device 718 may correspond to the user input interface (e.g. user input interface 531). In one or more non-limiting, exemplary embodiments, the control device 718 includes press buttons 702 and 704 which can be used for to select a spotlight or floodlight mode. The control device 718 also includes press buttons 706 which can be used to manually increase or decrease the angle of light spread by the user. The control device 718 may also include a press button (not shown) to select a manual or autonomous controller operation mode, or to switch the light device on or off.

Figure 8:
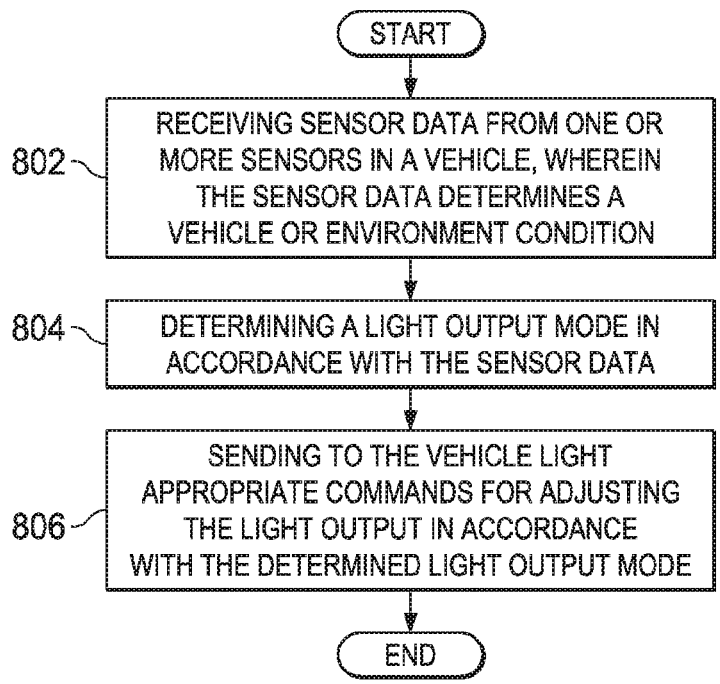
FIG. 8 is a flowchart illustrating a process for controlling a vehicle light in accordance with an illustrative embodiment.

FIG. 8 is a flowchart illustrating a process for controlling a vehicle light in accordance with an illustrative embodiment. The process described in FIG. 8 may utilize one or more components of the controller system shown in FIGS. 1-7 described above, such as, without limitation, the components of controller 520, sensor module 540, and vehicle light device 210 and 110.

In one exemplary embodiment, the process may correspond to an autonomous operation mode to adjust the light output of a vehicle light, for example without the need of input from a driver. The process may begin by receiving sensor data from one or more sensors in a vehicle, wherein the sensor data determines a vehicle or environment condition (step 802). The one or more sensors can be part of a sensor module, a controller box for the vehicle light, or vehicle integrated sensors. The sensor data are received by a controller of the vehicle light, such as the controller 520. For instance, a processor of the controller receives the sensor data via a wireless signal transceiver from the sensor or sensor module. Alternatively, the sensor data is received via a data cable connecting the sensor or sensor module to the controller. In yet another implementation, the sensor and the processor are integrated within the same controller box and the data is exchanged via some integrated connection or wiring.

The sensor data can be any information collected by one or more sensors for determining a vehicle or environment condition. For example, the sensor data includes data collected by an accelerometer and indicates the acceleration of the vehicle. The sensor data can also include the vehicle angular velocity collected by a gyrometer. A sensor data can also include GPS data (e.g. using GPS 548 as shown in FIG. 5) that indicates the vehicle position and the road type (e.g., open highway, narrow road, mountainous road, tunnel, bridge). In addition to vehicle movement related sensors, other sensor data can also be considered, such as visibility or weather condition related data.

Next, the process may include determining a light output mode in accordance with the sensor data (step 804). For example, when the controller or processor determines that the vehicle speed has increased or exceeded a preset threshold speed, a spotlight mode with narrow angle of light spread is chosen. In another example, the sensor data indicates a faster angular velocity at a turn. In this case, a floodlight mode with a wide angle of light spread is chosen. The controller may also determine according to GPS data that the vehicle is approaching a turn, a bridge, a tunnel, an open highway, or mountainous road, and selects accordingly a proper light output mode. For instance, a narrow light spread mode may be selected at a tunnel or open highway, while a wide light spread is selected at a turn, a bridge, or a mountainous road. The degree of the angle of spread for each chosen light mode can be preset. In yet another example, a controller for a marine based vehicle such as a speed boat, may determine according to GPS data that the boat is approaching the shore line or is far away from the shore line or other obstacles on the water surface. Thus, a narrow light spread mode may be selected in the case where the boat is near the shore line, while a wide light spread may be selected otherwise.

Subsequently, the process may include sending to the vehicle light appropriate commands for adjusting the light output in accordance with the determined light output mode (step 806). For instance, the controller or processor determines the appropriate commands for adjusting the light spread or light shape. The commands can include commands to be sent to the adjustability mechanism assembly at the vehicle light to adjust the spacing between the optics and the light source. The commands can also determine the light intensity at the vehicle light, for example the number of LEDs to turn on at the vehicle light. The process may terminate thereafter or may be continuously be repeated to adjust the light output as vehicle or environment conditions change.

Figure 9:
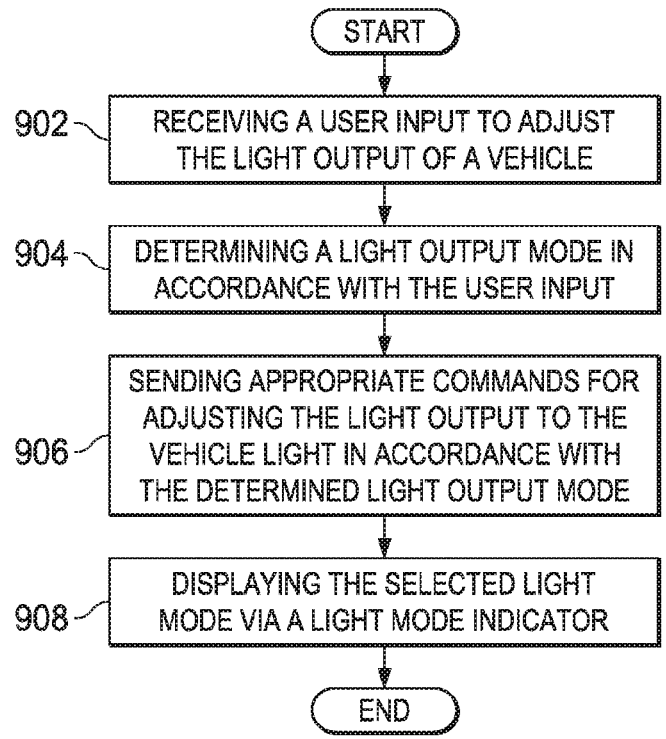
FIG. 9 is a flowchart illustrating another process for controlling a vehicle light in accordance with an illustrative embodiment.

FIG. 9 is a flowchart illustrating another process for controlling a vehicle light in accordance with an illustrative embodiment. In one or more embodiments, the process described in FIG. 9 may utilize one or more components of the controller system described in FIGS. 1-7 described above, such as, without limitation, the components of controller 520 and light device 210.

The process may correspond to a manual operation via user input to control light output of a vehicle light, for instance without using sensor data. The process may begin by receiving a user input to adjust the light output of a vehicle light (step 902). The user input is entered via a user input interface, for instance by pressing a button, turning a knob, or tapping a touch screen. The input can specify a preset mode such as a spotlight or floodlight mode. Alternatively, the input can be for adjusting a light output, such as increasing or decreasing the angle of light spread. The user input is received by a controller of the vehicle light, such as the controller 520. For instance, a processor 522 receives the user input from the user input interface 531. The user input can be received via a wireless signal from the user input interface to the controller. Alternatively, the user input is received via a data cable or an integrated connection between the user input interface and a processor in the controller box.

Next, the process may include determining a light output mode in accordance with the user input (step 904). The controller or processor processes the user input to determine which light output mode to select, e.g., to select between a spotlight or floodlight, or to determine the angle for light spread.

Subsequently, the process may include sending appropriate commands for adjusting the light output to the vehicle light in accordance with the determined light output mode (step 906). This step includes determining the appropriate commands for adjusting the light spread or light shape. The commands can include commands to the adjustability mechanism assembly at the vehicle light to adjust the spacing between the optics and the light source. The commands can also determine the light intensity at the vehicle light, for example the number of LEDs to turn on at the vehicle light.

The process may include an additional step of displaying the selected light mode via a light output mode indicator, such as the light output mode indicator 532 (step 908). The indication serves as a feedback to the user to highlight the currently selected light mode at the vehicle light. The process may terminate thereafter or may be continuously repeated to adjust the light output as the user or driver continues to manually select or change the light mode.

Many desirable benefits are provided by adjusting the light output a vehicle light or light fixture using a controller system as described in one or more embodiments herein. A vehicle light device, as described above, may be used to produce a floodlight or a spotlight, and to further illuminate an area of road or highway that is being driven upon. Notably, a vehicle light device as described herein may be useful for any type of user. For example purposes, without limitation, police, fire, emergency personnel may find such a light device particularly useful for providing either a wider-angle floodlight to better illuminate a broad area or to shine a more narrow focused spotlight at a scene of interest. In addition, off-road vehicle drivers and operators may find such a light device particularly useful. Off-road vehicles frequently venture onto roads that are uneven and unpaved at relatively high speeds. Being able to switch between a floodlight and a spotlight produced by a same light device may enable such off-road vehicles to manage such uneven terrain at high speeds much better than before. Nevertheless, as previously stated, one or more embodiments of a controller system for adjusting the light output of a vehicle light as described in the present description may have any number of applications and may benefit a variety of users, including the non-commercial, average driver of a non-commercial vehicle.

The flowchart and block diagrams in the figures illustrate the architecture, functionality, and operation of possible implementations of the controller and light system components according to various embodiments. The detailed description of the illustrative embodiments above is described in sufficient detail to enable those skilled in the art to practice the invention. To avoid unnecessary detail, the description may have omitted certain information known to those skilled in the art.

Although the illustrative embodiments described herein have been disclosed in the context of certain illustrative, non-limiting embodiments, it should be understood that various changes, substitutions, permutations, and alterations may be made to these embodiments without departing from the broader spirit and scope of the invention as set forth in the claims. It is also understood that other embodiments may be utilized and that logical structural, mechanical, chemical, and/or electrical changes may be made without departing from the spirit or scope of the invention.

What is claimed is:

1. An apparatus for controlling a vehicle light with an adjustable light output, the apparatus comprising:
   a processor configured to receive sensor data and determine a light output mode for the vehicle light in accordance with the sensor data, wherein the sensor data indicates one or more vehicle or environmental conditions; and
   a transceiver coupled to the processor and configured to signal the light output mode to the vehicle light, wherein the processor is configured to determine an angle of spread of the light output in accordance with the sensor data.

2. The apparatus of claim 1, wherein the apparatus further comprises or is coupled to a sensor module comprising one or more sensors configured to detect the one or more vehicle or environmental conditions, wherein the sensor data is configured to be sent to the processor.

3. The apparatus of claim 2 further comprising a second transceiver, wherein the second transceiver is configured to receive the sensor data from the sensor module.

4. The apparatus of claim 2, wherein the sensor module comprises an accelerometer configured to detect an acceleration of a vehicle.

5. The apparatus of claim 2, wherein the sensor module comprises a gyrometer configured to detect angular velocity of a vehicle.

6. The apparatus of claim 2, wherein the sensor module comprises a global positioning system (GPS) configured to detect a position of a vehicle.

7. The apparatus of claim 2, wherein the sensor module comprises a second transceiver, the second transceiver configured to send the sensor data to the processor.

8. The apparatus of claim 1, wherein the light output mode is one of a spotlight mode and a floodlight mode.

9. The apparatus of claim 1, wherein the vehicle light is an auxiliary light fixture attachable to or mountable on a vehicle.

10. The apparatus of claim 1, wherein the one or more vehicle or environment conditions correspond to any one of the group comprising vehicle speed, vehicle turn, vehicle surrounding environment, or visibility.

11. The apparatus of claim 1, wherein the apparatus further comprises or is coupled to a user input interface, wherein the processor is further configured to receive from the user input interface a user selection related to the vehicle light or the light output mode.

12. The apparatus of claim 1, wherein the apparatus further comprises or is coupled to a light output mode indicator configured to display the light output mode of the vehicle light.

13. A method of controlling a vehicle light with adjustable light mode, comprising:
receiving sensor data from one or more sensors in a vehicle, wherein the sensor data determines one or more vehicle or environment conditions;
determining, using a processor, a light output mode in accordance with the sensor data; and
sending to the vehicle light appropriate commands for adjusting the light output in accordance with the determined light output mode, wherein determining the light output mode in accordance with the sensor data includes decreasing the angle of light spread upon detecting a vehicle speed exceeding a preset threshold, and increasing the angle of light spread upon detecting a vehicle turn.

14. The method of claim 13, wherein the sensor data includes data detected by an accelerometer for determining an acceleration of a vehicle.

15. The method of claim 13, wherein the sensor data includes data detected by a gyrometer for determining angular velocity of a vehicle.

16. The method of claim 13, wherein the sensor data includes data detected by a global positioning system (GPS) for determining a position of a vehicle.

17. The method of claim 13, wherein determining the light output mode in accordance with the sensor data includes selecting a spotlight mode upon detecting the vehicle speed exceeding a preset threshold, and selecting a floodlight mode upon detecting the vehicle turn.

18. The method of claim 13, further comprising receiving the sensor data in the vehicle and sending the commands to the vehicle light using a wireless signal connection, a data cable, or both.

19. An apparatus for controlling a vehicle light with adjustable light output, the apparatus comprising:

a processor configured to receive user input and determine an angle of light spread for the vehicle light in accordance with the user input; and
a transceiver coupled to the processor and configured to signal the determined angle of light spread to the vehicle light.

20. The apparatus of claim 19, wherein the apparatus further comprises or is coupled to a user input interface configured to send the user input to the processor in accordance with a user selection related to the vehicle light.

21. The apparatus of claim 20, wherein the selection corresponds to increasing or decreasing, at the user input interface, the angle of light spread.

22. The apparatus of claim 20, wherein the selection corresponds to selecting, at the user input interface, a spotlight or a floodlight mode with a preset angle of light spread.

23. The apparatus of claim 20, wherein the user input interface comprises a knob, one or more press buttons, or a touch screen.

24. The apparatus of claim 19, wherein the apparatus further comprises or is coupled to a light output mode indicator configured to display the angle of light spread or a corresponding light output mode of the vehicle light.

25. The apparatus of claim 24, wherein the light output mode indicator includes a gauge, a light emitting diode (LED), and/or a display screen.

26. A method of controlling a vehicle light with adjustable light mode, comprising:
receiving user input from a user input interface in a vehicle,
determining, using a processor, an angle of light spread for the vehicle light in accordance with the user input; and
signaling the determined angle of light spread to the vehicle light.

27. The method of claim 26, wherein determining the angle of light spread in accordance with the user input includes decreasing the angle of light spread upon detecting a user selection at the user input interface to decrease the angle of light spread, and increasing the angle of light spread upon detecting a user selection at the user input interface to increase the angle of light spread.

28. The method of claim 27, wherein determining the angle of light spread in accordance with the user input includes selecting a spotlight mode for the vehicle light upon detecting at the user input interface a selection for the spotlight mode, and selecting a floodlight mode for the vehicle light upon detecting at the user input interface a selection for the floodlight mode.

* * * * *